United States Patent [19]

Parsons et al.

[11] Patent Number: 4,824,728

[45] Date of Patent: Apr. 25, 1989

[54] MULTILAYER DURABLE FLUOROCARBON COATINGS

[75] Inventors: Gerry A. Parsons, St. George; Pat P. Li, Agincourt, both of Canada

[73] Assignee: DeSoto, Inc., Des Plaines, Ill.

[21] Appl. No.: 106,527

[22] Filed: Oct. 9, 1987

[51] Int. Cl.$^4$ .................... B32B 27/28; B32B 15/08
[52] U.S. Cl. ................................. 428/421; 428/463
[58] Field of Search .................. 428/421, 461, 463; 427/407.1; 524/512; 525/155, 158, 108

[56] References Cited

U.S. PATENT DOCUMENTS

| | | | |
|---|---|---|---|
| 4,314,004 | 2/1982 | Stoneberg | 428/421 |
| 4,659,768 | 4/1987 | Tortorello et al. | 524/512 |
| 4,684,677 | 8/1987 | Higginbotham et al. | 525/108 XZ |
| 4,710,426 | 12/1987 | Stephens | 428/421 XZ |

*Primary Examiner*—Thomas J. Herbert
*Attorney, Agent, or Firm*—Dressler, Goldsmith, Shore, Sutker & Milnamow, Ltd.

[57] ABSTRACT

Substrates, and especially aluminum substrates, are durably coated to include, as a basecoat, a heavily pigmented opaque coating composition consisting essentially of from about 45% to about 85% of a fluorocarbon resin and from 15% to about 55% of an acrylic resin, and having a pigment volume concentration sufficient to visually obliterate anything beneath it, said heavily pigmented coating composition being overcoated with a fluorocarbon topcoat containing from about 45% to about 85% of a fluorocarbon resin, and from about 15% to about 55% of an acrylic resin, on a resin solids basis, and having a pigment volume concentration of at least about 1%, on a film solids basis, the pigment content of said topcoat being insufficient to prevent the color of the basecoat from being easily seen.

10 Claims, No Drawings

MULTILAYER DURABLE FLUOROCARBON COATINGS

TECHNICAL FIELD

This invention relates to pigmented multilayer fluorocarbon coating systems characterized by improved durability on exterior exposure.

BACKGROUND ART

Pigmented fluorocarbon coatings are recognized today for the coating of architectural panels, it being intended that these coatings provide an attractive finish which will resist fading and chalking for long periods of time. The attractive finish demands that the coatings be heavily pigmented to obliterate sight of the substrate or primer coat with pigments which do not well resist weathering and the ultraviolet radiations contained in sunlight. As a result, and as taught in U.S. Pat. No. 4,314,004 issued Feb. 2, 1982 to Richard L. Stoneberg, the heavily pigmented coatings are not directly exposed to the elements, but are instead overcoated with a clear fluorocarbon topcoat which protects the pigmented basecoat against the elements and screens out some of the sunlight so that the pigmented coating layer does not change color or fade. Unfortunately, these clear topcoats introduce their own problems, namely: the topcoats lack solvent resistance and film integrity and the fluorocarbon resin in the topcoat tends to yellow upon baking. The solvent resistance of topcoats has previously been addressed in commonly owned U.S. Pat. No. 4,659,768 issued Apr. 21, 1987 to Anthony J. Tortorello and Clark A. Higginbotham, but the inadequate color stability and yellowing tendency on baking of the clear topcoats have not hitherto been resolved.

This industrial problem has persisted for several years, the workers in the art being unable to overcome it. On the one hand, the pigmented coatings can be left unprotected, in which case the pigments therein fade and the initial color changes with time. On the other hand, the pigmented coatings can be overcoated with a clear fluorocarbon topcoat, in which case the clear topcoat has poor mar resistance and tends to yellow with baking (the thicker the coating, the more the yellowing).

DISCLOSURE OF INVENTION

In this invention, the conventional heavily pigmented fluorocarbon base coat which visually obliterates anything beneath it is overcoated with a lightly pigmented fluorocarbon topcoat. More particularly, a durably coated substrate (usually prime coated) is coated with a heavily pigmented coating composition consisting essentially of from about 45% to about 85% of a fluorocarbon resin and from 15% to about 55% of an acrylic resin. By heavily pigmented is meant a coating which is sufficiently opaque as to visually obliterate anything beneath it. The amount of pigment needed for this purpose will vary with the hiding power of the pigment selected, but when titanium dioxide is used a pigment volume concentration of at least about 5% on a film solids basis is adequate, albeit more pigment up to about 20% can be used, especially when pigments other than titanium dioxide are employed. This heavily pigmented coating composition is overcoated with a semi-transparent fluorocarbon topcoat containing from about 45% to about 85% of a fluorocarbon resin, from about 15% to about 55% of an acrylic resin, based on the total weight of resin, and having a pigment volume concentration of at least about 1%. The proportion of pigment in the topcoat will, again, vary with the hiding power of the pigment, but the pigment content of the topcoat should not be sufficient to prevent the color of the basecoat from being easily seen. Using titanium dioxide as the pigment in the topcoat, more than a pigment volume concentration of about 3% begins to visually obscure the basecoat, but with other pigments, one may use a pigment volume concentration up to about 4.5%.

It has been found that when the fluorocarbon topcoat is pigmented in the described manner, the topcoat is toughened by the pigment to introduce added flexibility and mar resistance, and the pigment helps to protect the topcoat against yellowing upon baking. This is because the pigment provides a color contribution which does not change on baking, and this masks any change in color in the resin phase of the topcoat induced by baking. The pigment in the topcoat is preferably selected to match that in the basecoat, so the desired coloration is better achieved herein than when the desired coloration was modified by the yellowed topcoat, as in the prior art.

It is stressed that the concentration of pigment in the topcoat is insufficient to have a noticeable effect on the overall appearance provided by the heavily pigmented basecoat, except for a slight milkiness (or cloudiness) which can be regarded as attractive since it minimizes the tendency of the topcoat to acquire a yellow cast on baking. Also, if the ultraviolet radiation discolors the small concentration of pigment in the topcoat, that discoloration is difficult to detect because the coloration of the basecoat is easily visible through the topcoat and continues to dominate the overall appearance. Moreover, the topcoat contains more resin to protect less pigment, so the pigment in the topcoat is better protected against discoloration than the pigment in the basecoat.

The topcoats are solvent solution coatings which will normally contain, exclusive of the pigment component, at least about 45% of a fluorocarbon polymer, especially a polyvinylidene fluoride copolymer, together with at least about 10% of an organic solvent-soluble copolymer consisting essentially of nonreactive monoethylenically unsaturated monomers.

In the preferred practice of this invention, the topcoat is a thermosetting solvent solution coating composition which comprises volatile organic solvent having dissolved therein at least about 45% of a fluorocarbon polymer, especially a polyvinylidene fluoride copolymer, together with at least about 10% of an hydroxyfunctional organic solvent-soluble copolymer containing from 3% to 8% of 2-hydroxyethyl acrylate, preferably from 4% to 6%, the balance consisting essentially of nonreactive monoethylenically unsaturated monomers, and an aminoplast curing agent in an amount to cure said hydroxy-functional copolymer.

Preferred proportions of the fluorocarbon polymer are from about 70% to about 80%.

It is noted in passing that the heavily pigmented fluorocarbon basecoat is itself usually deposited upon a prime coating which is directly coated upon a metal substrate, but that is itself conventional. Preferred prime coatings for use in this invention are disclosed in commonly owned U.S. Pat. No. 4,684,677 which issued on August 4, 1987.

As a matter of interest, the substrates which are coated are usually aluminum, but hot-dipped galvanized steel and the like may also be coated, and the various coatings may be applied by coil coating followed by fabrication of the coated and baked metal into panel form, or the panels can be coated after formation, as by spray application.

The fluorocarbon polymer is preferably a homopolymer of vinylidene fluoride, i.e., polyvinylidene fluoride, but one may also employ copolymers of vinylidene fluoride containing a major proportion of vinylidene fluoride. These copolymers desirably contain at least 95 mol percent of the vinylidene fluoride. Suitable comonomers are the halogenated ethylenes, such as symmetrical dichlorodifluoroethylene, 1,1-2-trifluoro-2-chloroethylene, tetrafluoroethylene, vinyl chloride, vinyl acetate, and others. While vinylidene fluoride is the preferred fluorocarbon polymer, the corresponding vinyl fluoride polymers and copolymers are also useful. These fluorocarbon polymers are well known to the art and are referred to in the prior documents noted hereinbefore. The preferred fluorocarbon polymer is polyvinylidene fluoride.

As is well known in the art, the fluorocarbon polymer is dispersed in a solvent solution coating composition containing dissolved polymer which is usually an acrylic copolymer. In the Stoneberg patent this acrylic copolymer can be either thermoplastic or thermosetting, but thermoplastic copolymers are preferred therein. In U.S. Pat. No. 4,659,768, the copolymer is hydroxy-functional and thermosets in combination with an aminoplast resin. Either type of dissolved polymer may be used herein, alone or in admixture with one another, and the topcoats of this invention may be thermoplastic or thermosetting, ableit the thermoset systems of U.S. Pat. No. 4,659,768 are preferred because of the improved solvent and abrasion resistance which is provided in this manner.

In the preferred thermosetting topcoats, the hydroxy-functional resin is selected as described in said U.S. Pat. No. 4,659,768, and the preferred aminoplast curing agent is simply a formaldehyde condensate with an amine, preferably melamine, to provide a heat-hardening methylol-functional resin. While many aminoplast resins are broadly useful, such as urea formaldehyde condensates and benzoguanamine formaldehyde condensates, it is preferred that the aminoplast resin be a polyalkoxymethyl melamine resin in which the alkoxy group contains from 1-4 carbon atoms. Appropriate melamine-formaldehyde condensates are readily available in commerce and are usually etherified with lower alcohols for use in organic solvent solution, as is well known.

The aminoplast resin is desirably used in an amount of from 5% to 25% of total resin solids, preferably in an amount of from 7% to 20% of total resin solids.

All ratios and proportions herein are by weight, except as stated, and the proportion of all resinous materials is based on the total weight of resin solids, excluding the pigment.

The resin components which have been described are employed herein in solvent solution. Various volatile solvents are commonly used, such as methyl ethyl ketone, toluene, xylene, dipropylene glycol monoacetate, butyl acetate, and the like. Solvent selection is of secondary significance in this invention. Application by roll coating and spray are both contemplated, and the art is fully familiar with the details of each.

While organic pigments are useful, inorganic pigments are preferably used and are desirably constituted by titanium dioxide which may be used alone or together with a filler or a pigment providing desired coloration. These pigments and fillers are preferably inorganic, and are illustrated by silica, iron oxides, talc, mica, clay, zinc oxide, zinc sulphide, zirconium oxide, carbon black, lead chromate, calcium carbonate and barium sulfate. A feature of this invention is to pigment the topcoat using a portion of the basecoat composition so as to ease the burden of matching colors.

The hydroxy-functional solution copolymer is the copolymer produced by solution copolymerization in the presence of free-radical polymerization initiator of monoethylenically unsaturated monomers including the required proportion of 2-hydroxyethyl acrylate. The other monomers are preferably acrylic esters and methacrylic esters with alcohols containing from 1 to 12 carbon atoms, preferably from 1 or 2 carbon atoms. Most preferably, the other monomers consist of at least 50% of methyl methacrylate and the balance ethyl acrylate, most preferably from 55% to 65% methyl methacrylate, balance ethyl acrylate. Small amounts, up to about 1%, of a carboxylic acid, like acrylic acid or methacrylic acid, may be tolerated.

The hydroxy copolymer is preferably used in an amount of from 15% to 30%, most preferably from 21% to 25%.

The invention is illustrated in the following example of preferred practice using spray application, albeit coil application is also useful.

EXAMPLE 1

Grind 154 pounds of titanium dioxide, rutile and 17 pounds of strontium chromate into 91 pounds of a 55% solids content solution of an hydroxy-functional acrylic copolymer in propylene glycol mono-methyl ether acetate [hereinafter PMA] together with 50 pounds of additional PMA. The hydroxy-functional acrylic copolymer is a solution copolymer of 20% ethyl acrylate, 65% methyl methacrylate, and 15% of 2-hydroxyethyl methacrylate. The production of this copolymer solution is described in U.S. Pat. No. 4,659,768 and is the experimental resin set forth in column 3 of that patent. Grinding is continued to a 7½ North Standard grind gauge rating.

The pigment paste produced above is thinned by sequentially mixing in 150 pounds of butyl acetate, 200 pounds of additional 55% solids hydroxy-functional acrylic copolymer solution described above, 65 pounds of a diglycidyl ether of bisphenol A having a molecular weight of 390, and 62 pounds of an etherified melamine-formaldehyde condensate [90% solution in organic solvent] (Monsanto product Resimene 740 may be used). Then 150 pounds of polyvinylidene fluoride polymer (Kynar 500 supplied by Pennwalt, King of Prussia, PA may be used) is sifted in and the mixture is then subjected to high speed agitation until a North Standard grind gauge rating of 6 is obtained.

Viscosity is then adjusted with 92 pounds of PMA and 30 pounds of butyl acetate to provide a primer which is packaged and which has sufficient viscosity to maintain the pigments in stable suspension.

The above primer is thinned for spray application by the mixing of from 4 to 5 parts of the primer with 1 part of methyl ethyl ketone, and the thinned primer is sprayed on an aluminum panel to provide a dry film thickness of 0.2-0.4 mil, and allowed to dry in air at room temperature which takes from 5 to 10 minutes.

EXAMPLE 2

The air dried primer is then overcoated by the spray application of a heavily pigmented fluorocarbon basecoat which is applied from solvent solution. This basecoat is then dried in air at room temperature, which again takes about 5 to 10 minutes. The topcoat can be applied to the air dried basecoat, but in this example the basecoat was cured by baking for 10 minutes to a peak metal temperature of 450° F. The basecoat was formulated as follows:

The following components were loaded into a high speed mixer in the order named and mixed. It is convenient to use a Hockmeyer Blade to facilitate mixing (also known as a Cowles Blade). Mixing is continued for 10 to 20 minutes after all the components are present to provide a homogeneous blend.

| Component | Parts by Wt. |
| --- | --- |
| 1- Fluorocarbon polymer dispersion | 552.89 |
| 2- White concentrate | 479.87 |
| 3- Thermoplastic copolymer sol'n | 83.46 |
| 4- Wax solution | 27.17 |
| 5- PMA | 20.86 |
| 6- Butyl ether of diethylene glycol | 14.60 |
| 7- Dimethyl phthalate | 14.60 |
| 8- Methyl ethyl ketone | 25.04 |

The components of the above will be described more fully later, except for the white concentrate in the above basecoat composition which is prepared by sandmilling the following, in order, to a North Standard grind gauge rating of 7.5.

| Component | Parts by Wt. |
| --- | --- |
| 1- Thermoplastic copolymer sol'n | 343.0 |
| 2- PMA | 189.0 |
| 3- Titanium dioxide, rutile | 863.0 |

The above are milled and the mill is rinsed with 10 parts of PMA and 10 parts of the thermoplastic copolymer solution, and the rinse material is then added to the batch. This concentrate has a pigment volume concentration of 21.38%.

The final white-pigmented basecoat composition has a pigment volume concentration of 6.18% and may be used as such or it can be tinted to provide a slight coloration. It is now preferred to add 0.83 part of lampblack, 0.63 part of iron oxide yellow, and 0.02 part of iron oxide red to provide a very faint tint, but this is only a faint coloration and is not essential.

EXAMPLE 3

The basecoat composition of Example 2 was then used to provide a lightly pigmented topcoat composition having a pigment volume concentration of 1.69% in the following manner. This lightly pigmented coating was semi-transparent in appearance when applied and baked.

More particularly, the lightly pigmented topcoat composition is provided by loading the following in order and mixing at high speed using the Hockmeyer Blade to facilitate mixing, as previously noted. Mixing is continued for 10 to 20 minutes after all the components are present to provide a homogeneous blend.

| Component | Parts by Wt. |
| --- | --- |
| 1- Fluorocarbon polymer dispersion | 631.32 |
| 2- Pigmented Fluorocarbon basecoat | 317.51 |
| 3- Hydroxy-functional acrylic | 91.77 |
| 4- Thermoplastic copolymer | 58.57 |
| 5- Aminoplast resin | 9.38 |
| 6- Wax solution | 23.81 |
| 7- Butyl ether of diethylene glycol | 15.05 |
| 8- Dimethyl phthalate | 15.05 |

The thoroughly mixed dispersion produced above constitutes a finished product. One can test the coating to see if the gloss is too high, in which case one can add a flatting paste to reduce the gloss, as desired and as is well known. Also, one can adjust the viscosity, as desired. We typically adjust viscosity by mixing in about 20 parts of PMA.

The flurocarbon polymer dispersion of component 1 in this topcoat composition and in Example 2 is a dispersion of Kynar 500 in solvents provided by sandmilling the following.

| Component | Parts by Wt. |
| --- | --- |
| 1- Dimethyl phthalate | 277.0 |
| 2- 2-butoxy ethanol | 200.0 |
| 3- PMA | 67.0 |
| 4- Kynar 500 | 493.0 |
| 5- Thermoplastic copolymer sol'n | 77.0 |
| 6- PMA | 28.0 |

The above is sand milled to a North Standard rating of 6, and the following are add and the grind completed:

| 7- Thermoplastic copolymer sol'n | 45.0 |
| --- | --- |
| 8- PMA | 28.0 |

The hydroxy-functional acrylic which is component 3 in the topcoat composition is the same 55% solution used in in Example 1.

The thermoplastic copolymer solution used in the topcoat composition as component 4 thereof, in Example 2 and elsewhere herein is a 40% solids solution of a copolymer of 65% methyl methacrylate and 35% ethyl acrylate. One may use the the commercially available copolymer solution from Rohm & Haas Company, Philadelphia, PA under the trade designation Acryloid B44S, the S designating the 40% solution character of the product.

The aminoplast resin used in the topcoat composition as component 5 thereof is a hexamethoxymethyl melamine commercially available from Monsanto under the designation Resimene 745.

The wax solution used in the topcoat composition as component 6 thereof and in Example 2 is a 20% polymekon wax solution supplied by A. S. Paterson Co. Ltd.

This lightly pigmented topcoat solution contained about 1.7% by volume of pigment. It was applied over the previously described baked on polyvinylidene fluoride basecoat, and the overcoated basecoat is then baked for 10 minutes to a peak metal temperature of 450° F.

The final cured multi-layered coatings were more mar-resistant than if the topcoat were unpigmented, yellowing on baking was considerably reduced to improve the appearance of the final product, and the baked coatings had an attractive milky surface, albeit the appearance of the pigmented basecoat was fully visible through the semi-transparent topcoat. On extensive exposure testing the baked coatings exhibited remarkably little change in color.

What is claimed is:

1. A durably coated substrate coated with a heavily pigmented opaque basecoat composition consisting essentially of from about 45% to about 85% of a fluorocarbon resin and from 15% to about 55% of an acrylic resin, and having a pigment volume concentration sufficient to visually obliterate anything beneath it, said heavily pigmented coating composition being overcoated with a fluorocarbon topcoat containing from about 45% to about 85% of a fluorocarbon resin, and from about 15% to about 55% of an acrylic resin, on a resin solids basis, and having a pigment volume concentration of at least about 1%, on a film solids basis, the pigment content of said topcoat being insufficient to prevent the color of the basecoat from being easily seen, said pigment volume concentration being up to about 3% when titanium dioxide is the pigment in the topcoat, and the pigment volume concentration being up to about 4.5% when said topcoat contains a pigment other than titanium dioxide, and said topcoat being pigmented with the same pigment composition as in said basecoat.

2. A durably coated substrate as recited in claim 1 in which said substrate is an aluminum substrate primed with a fluorocarbon-containing primer.

3. A durably coated substrate as recited in claim 1 in which said fluorocarbon polymer is polyvinylidene fluoride homopolymer.

4. A coating composition as recited in claim 1 in which said fluorocarbon resin is present in an amount of from about 70% to about 80%.

5. A durably coated substrate as recited in claim 1 in which the acrylic resin in said topcoat is an hydroxy-functional organic soluble copolymer of from 3% to 8% of 2-hydroxyethyl acrylate, balance consisting essentially of nonreactive monoethylenically unsaturated monomers, and an aminoplast curing agent in an amount to cure said hydroxy-functional copolymer, said proportions being by weight based on the total weight of resin solids.

6. A durably coated substrate as recited in claim 5 in which said aminoplast resin is a polyalkoxymethyl melamine present in an amount of from 4% to 10%.

7. A durably coated substrate as recited in claim 5 in which said aminoplast resin is present in an amount of from 3% to 20%.

8. A durably coated substrate as recited in claim 5 in which said acrylic copolymer is present in an amount of from about 15% to about 30%.

9. A durably coated substrate as recited in claim 8 in which said nonreactive monomers consist of esters of acrylic acid and methacrylic acid with $C_1$—$C_{12}$ alcohols.

10. A durably coated substrate as recited in claim 9 in which said nonreactive monomers include at least 50% of methyl methacrylate.

* * * * *